United States Patent [19]
Welschof et al.

[11] Patent Number: 4,608,028
[45] Date of Patent: Aug. 26, 1986

[54] ROTARY CONSTANT VELOCITY UNIVERSAL JOINT

[75] Inventors: Hans-Heinrich Welschof, Rodenbach; Edgar Dries, Rodgau, both of Fed. Rep. of Germany

[73] Assignee: Lohr & Bromkamp GmbH, Fed. Rep. of Germany

[21] Appl. No.: 794,954

[22] Filed: Nov. 4, 1985

Related U.S. Application Data

[63] Continuation of Ser. No. 639,602, Aug. 9, 1984, abandoned, which is a continuation of Ser. No. 538,976, Oct. 4, 1983, abandoned, which is a continuation of Ser. No. 359,435, Mar. 18, 1982, abandoned.

[30] Foreign Application Priority Data

Apr. 9, 1981 [DE] Fed. Rep. of Germany ....... 3114290

[51] Int. Cl.⁴ ............................................... F16D 3/23
[52] U.S. Cl. .................................... 464/145; 464/906
[58] Field of Search ................ 464/143, 145, 146, 906

[56] References Cited

U.S. PATENT DOCUMENTS

| | | | |
|---|---|---|---|
| 2,006,026 | 6/1935 | Midthun | 464/145 |
| 3,186,189 | 6/1965 | Cull | 464/145 |
| 3,785,172 | 1/1974 | Parsons | 464/146 |
| 3,869,878 | 3/1975 | Davies et al. | 464/146 X |
| 3,928,985 | 12/1975 | Girguis | 464/906 X |
| 4,012,925 | 3/1977 | Krude | 464/146 |
| 4,156,353 | 5/1979 | Welschof | 464/145 |
| 4,185,476 | 1/1980 | Krude | 464/145 |

FOREIGN PATENT DOCUMENTS

| | | | |
|---|---|---|---|
| 1066451 | 4/1967 | United Kingdom . | |
| 1447078 | 8/1976 | United Kingdom | 464/146 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

In a universal joint, a spacing is provided between the inner face of the cage and the outer face of the inner joint member and within the outer joint member there is provided a stop face which cooperates with a supporting face on the inner joint member in order to accommodate axial forces. As a result, a fixed joint is provided wherein it is not necessary to machine the inner face of the cage and the outer face of the inner joint member with axial forces being nevertheless accommodated.

5 Claims, 4 Drawing Figures

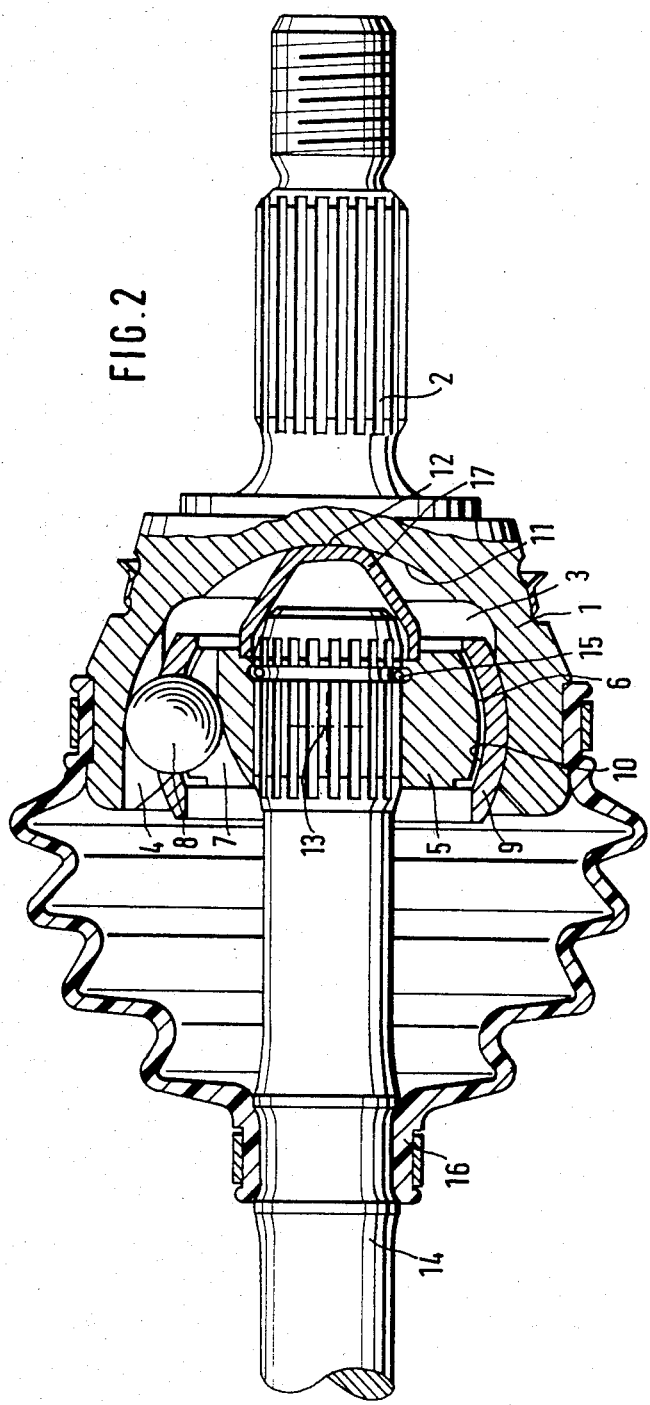

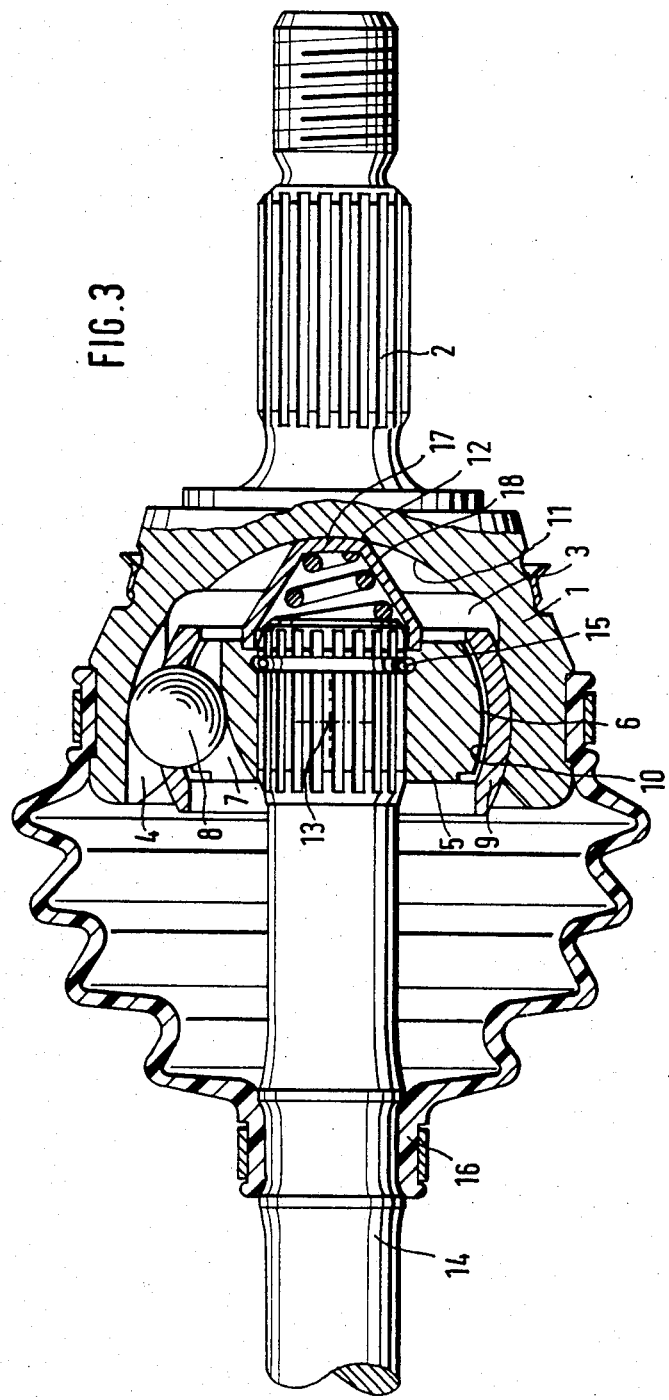

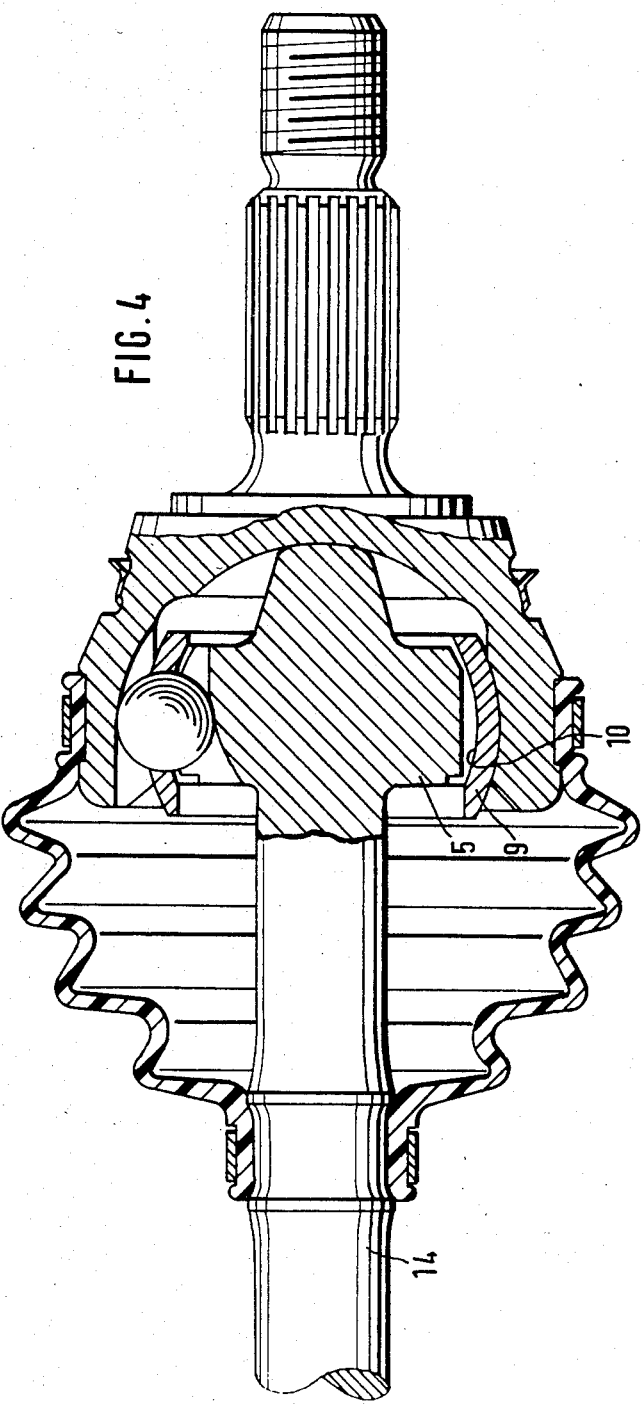

ROTARY CONSTANT VELOCITY UNIVERSAL JOINT

This is a continuation of application Ser. No. 639,602, filed Aug. 9, 1984, now abandoned which is a continuation of application Ser. No. 538,976, filed Oct. 4, 1983, now abandoned, which was a continuation of application Ser. No. 359,435 filed Mar. 18, 1982, now abandoned.

The present invention relates generally to rotary constant velocity universal joints and particularly to universal joints of the type which include an outer joint member having a spherical hollow space provided with grooves, an inner joint member arranged within the outer joint member and nonrotatively connected to a drive shaft having a corresponding number of grooves in its outer face, with one groove of each of the inner and outer joint members receiving therein a ball held in the windows of a cage which is arranged radially between the inner and outer joint members and which operates to support the balls as torque transmitting members of the joint assembly. The cage is formed with a hollow inner space and a concentric outer spherical face, with the cage being supported in the hollow space of the outer joint member at its spherical outer face.

Joints of the type to which the present invention relates are known, for example, from British Pat. No. 1,066,451 wherein the angle of articulation of the joint assembly is limited as a result of a splined shaft which is extended from inside of the outer joint member. In order to ensure proper functioning, the cage of the joint assembly with its spherical inner face and its spherical outer face must be accurately guided in the hollow space of the outer joint member and on the outer face of the inner joint member. Guiding the cage in this way serves to accommodate axial forces which will arise in the joint assembly. In order to enable these surfaces to accommodate the axial forces which are generated, they must be machined to very accurate tolerances and, in some cases, must even be subjected to a grinding operation. Since these surfaces are in constant sliding engagement with each other and since there is a constant axial force generated due to a torque load developed in the joint assembly, high friction losses tend to occur in the joint between the cage and the outer face of the inner joint member.

The present invention is directed toward provision of a fixed joint wherein the need for machining the inner face of the cage and the outer face of the inner joint member is eliminated and wherein axial forces are nevertheless accommodated so that the parts can be produced without requiring forming procedures such as machining or the like, i.e., the parts may be produced in a "non-chip" forming manner.

SUMMARY OF THE INVENTION

Briefly, the present invention may be defined as a rotary constant velocity universal joint assembly comprising: an outer joint member defining a spherical hollow space therein; an inner joint member arranged within said hollow space; a drive shaft nonrotatively connected with said inner joint member; torque transmission means operatively interposed between said inner and outer joint members engaged within grooves formed, respectively, within each of said members; cage means arranged radially between said inner and said outer joint members, said cage means being arranged to receive in supporting engagement therein said torque transmission means; said cage means including inner wall means defining a hollow space therein within which said inner joint member is received and a spherical outer face held within said spherical hollow space defined within said outer joint member; said inner wall means of said cage means and said inner joint member being arranged in spaced relationship from each other; a stop face defined in said spherical hollow space formed within said outer joint member; and a supporting face formed with either or both of said inner joint member and said drive shaft located on the side thereof facing said stop face and arranged for cooperating engagement therewith.

Thus, the objects of the invention are achieved by providing the hollow space of the outer joint member with a stop face and the inner joint member and/or the drive shaft with a supporting face cooperating with the stop face, the supporting face being provided on the side facing the stop face, the inner joint member with its outer face being arranged a distance or a space from the hollow space of the cage.

The joint assembly of the present invention provides advantages in that axial support will occur directly between the inner joint member or the splined shaft and the outer joint member when pressure loading occurs. Consequently, the pressure area between the inner face of the cage and the outer face of the inner joint member will be eliminated. As a result, production of the relevant parts by hot or cold extrusion will be enabled in a practical manner so that metal cutting may be limited to the inner bore required for receiving the splined shaft. The inner face of the cage will no longer require machining so that expensive operations requiring grinding of inner surfaces will no longer be required. Production of the stop face in the outer joint member and formation of the ball-receiving grooves by a pressing process may be effected in the same operation. In the case of joints which have a jaw-like opening of the ball grooves toward the open end thereof, the load arising due to tensile forces is accommodated by the balls and the cage itself since, due to the jaw-like opening, the cross-section is reduced when tensile forces occur thereby providing greater security. Accommodation of the axial forces directly in the axial direction ensures a high degree of joint efficiency.

In accordance with a further important characteristic of the invention, the supporting face is designed as a separate component which is firmly connected with the splined shaft and/or the inner joint member. The advantage of such a design is that the supporting face may be produced as a metal plate and inserted as a spacer between the inner joint member and the outer joint member.

In a further embodiment of the invention, in order to compensate for play occurring within the joint assembly, a spring element is arranged between the supporting face and the inner joint member or the splined shaft.

In order to ensure that a sufficient amount of play is provided between the inner joint member and the cage and in order to permit axial assembly of the joint thereby eliminating play in the longitudinal splines, and additionally to permit optimum design of the cage windows—since there does not arise a need to thread in the inner joint member—a further feature of the invention provides that the inner joint member, the splined shaft, and the supporting face be designed as a single unitary component.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is an axial sectional view showing a further embodiment of the joint of the invention which is similar in principal to that depicted in FIG. 1, the difference being that the supporting face is defined as a separate component;

FIG. 3 is an axial sectional view showing a further embodiment with a spring support provided to compensate for play; and FIG. 4 is an axial sectional view showing a joint of the invention wherein the splined shaft, the inner joint member and the supporting face are constructed as a single unitary component.

DETAILED DESCRIPTION OF THE PREFERRED EMBODIMENTS

Figure 1:
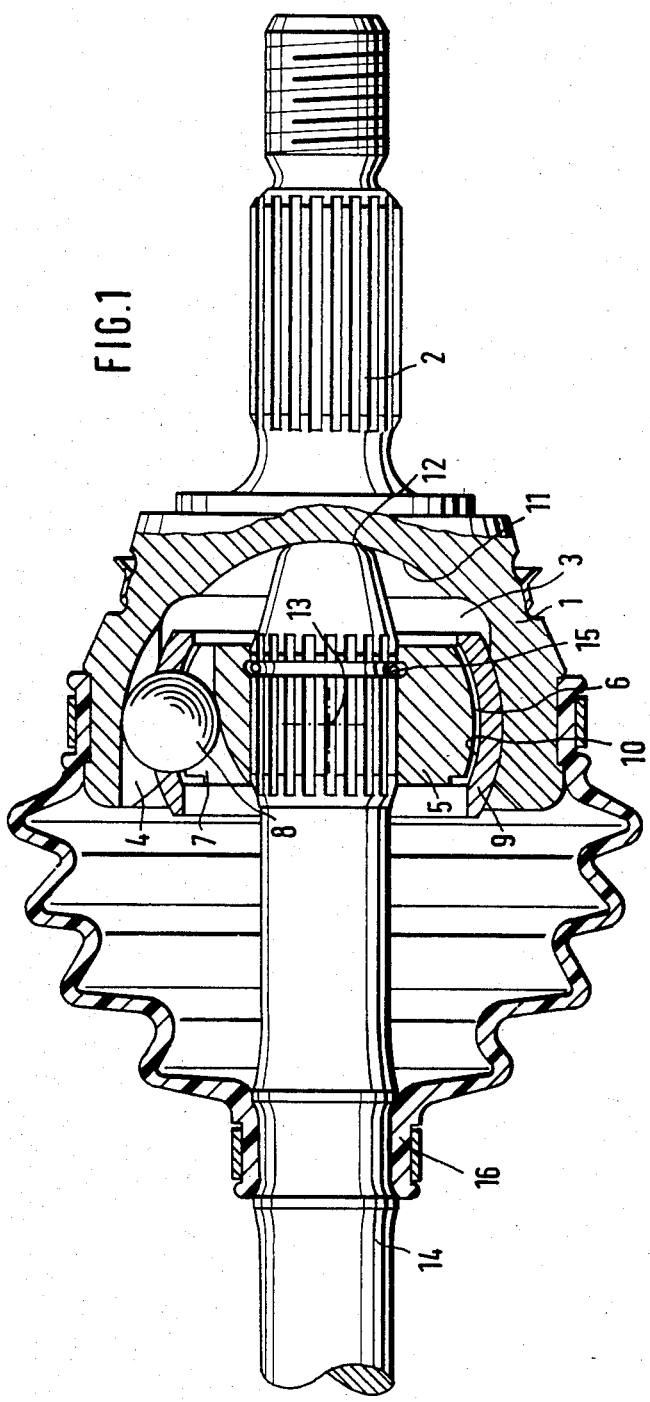
FIG. 1 is an axial sectional view showing a rotary constant velocity universal joint assembly in accordance with the invention.

Referring now to the drawings, and particularly to FIG. 1, there is depicted a rotary constant velocity universal joint assembly in accordance with the present invention which essentially consists of an outer joint member 1 having at one end thereof an axle shaft 2. Within a hollow space 3 defined within the outer joint member 1 there are formed grooves 4 which have been developed into the meridian planes thereof. The joint assembly further includes an inner joint member 5 which has also been provided with grooves 7 and which has a spherical outer face 6. In the assembly depicted in FIG. 1, one groove 4 of the outer joint member 1 and one groove 7 of the inner joint member 5 jointly receive therein a ball 8 for torque transmitting purposes, with a plurality of balls 8 being provided to form the torque transmission means of the assembly.

Due to the special arrangement of the grooves 4 and 7, control of the torque transmission balls 8 in the angle-bisecting plane is ensured and two cooperating grooves of the assembly will form a jaw-like opening through which the balls 8 are guided. In order to prevent the balls 8 from falling out of the grooves 4, 7, provision has been made in the form of a cage 9 located radially between the inner and outer joint members.

The grooves 4, 7 may be undercut-free or extend in a circular arc. The cage 9 serving to guide the balls 8 is held a distance from an outer face 6 of the inner joint member 5. The inner joint member 5 is formed with a bore which is provided with splines and within which there is received a splined shaft 14. The inner joint member 5 and the splined shaft 14 are protected against relative axial movement therebetween by a securing ring 15 or, alternatively, by adhesive means. In order to seal the hollow space 3 of the joint assembly, provision is made for a boot or bellows 16 which is shown in FIG. 1 as connected between the outer joint member 1 and the splined shaft 14.

Because a spacing exists between the spherical outer face 6 of the inner joint member 5 and the inner wall of the cage member 9 which defines the hollow space 10 thereof, the inner joint member 5 must be supported relative to the outer joint member 1. For this reason, provision is made for such support by means of a supporting face 12 which operates to enable the inner joint member 5 and/or the splined shaft 14 to support themselves or itself in the hollow space 3 of the outer joint member 1. Such support is further facilitated by formation of a stop face 11 on the interior of the outer joint member 1, which stop face 11 cooperates with the supporting face 12. As will be noted in FIG. 1, the supporting face 12 is in axial abutment with the stop face 11 and therefore the axial support which is provided eliminates the need for machining either the spherical outer face 6 of the inner joint member 5 or the inner wall of the cage 9 defining the hollow space 10.

A modification or further embodiment of the invention, corresponding to the embodiment shown in FIG. 1, is shown in FIG. 2, with the difference between the embodiments of FIGS. 1 and 2 consisting in that the supporting face 12 is made of a plate metal and has been designed as a separate part 17. The plate metal part 17 is connected with the splined shaft 14 and/or the inner joint member 5 and may be produced as a pressed part or similarly formed member utilizing a formation process that does not produce chips, i.e., a process wherein metal cutting is not necessary. The stop face 11 is produced together with the grooves 4 of the outer joint member 1 in a single operation.

A further modification or embodiment of the invention is depicted in FIG. 3 which is shown as including a spring element 18 located between the metal plate member defining the supporting face 12 and the splined shaft 14. The spring element 18 operates to compensate for play which may exist between the parts and it may be formed as a spiral spring, as illustrated in FIG. 3, or as a spring washer, plastic element or the like. It is also possible to support the inner joint member 5.

A further embodiment of the invention shown in FIG. 4 is, in principle, essentially similar to the embodiment depicted in FIG. 1, the difference being that in the embodiment of FIG. 4, the splined shaft 14 has been designed in such a manner that it is formed in one integral part together with the inner joint member 5 and the member defining the supporting face 12. In addition, in the embodiment of FIG. 4, the design is such that as a result of the play between the inner joint member 5 and the hollow space 10 of the cage 9, axial fitting of the inner joint member 5 in the cage 9 is made possible and facilitated. This means that the outer diameter of the inner joint member 5 is smaller than the diameter of the opening of the cage 9. This must be so as a result of the fact that a single component design is utilized and therefore conventional assembly by bending is not possible.

While specific embodiments of the invention have been shown and described in detail to illustrate the application of the inventive principles, it will be understood that the invention may be embodied otherwise without departing from such principles.

What is claimed is:

1. A rotary constant velocity fixed universal joint assembly comprising:
   an outer joint member defining a spherical hollow space therein;
   an inner joint member arranged within said hollow space;
   a drive shaft nonrotatively connected with said inner joint member;

torque transmission means operatively interposed between said inner and outer joint members;

grooves formed respectively within each of said members having said torque transmission means engaged therein;

cage means arranged radially between said inner and said outer joint members, said cage means being arranged to receive in supporting engagement therein said torque transmission means;

said cage means including inner wall means defining a hollow space therein within which said inner joint member is received and a spherical outer face held within said spherical hollow space defined within said outer joint member;

said inner wall means of said cage means and said inner joint member being arranged in spaced relationship relative to each other;

a stop face defined in said spherical hollow space formed within said outer joint member; and a supporting face formed with at least one of said inner joint member and said drive shaft located on the side thereof facing said stop face and arranged for cooperating engagement therewith;

said stop face and said supporting face abutting against each other to limit relative movement therebetween in one direction, with said grooves, said torque transmission means, said cage means and said outer joint member being formed to interact with each other so as to limit relative movement between said stop face and said supporting face in the opposite direction thereby to prevent relative axial movement between said inner joint member and said outer joint member.

2. An assembly according to claim 1 wherein said supporting face is formed upon a member structured as a separate component and being firmly connected with at least one of said drive shaft and said inner joint member.

3. An assembly according to claim 1 further comprising spring means arranged between said supporting face and one of said inner joint member and said drive shaft.

4. An assembly according to claim 1 wherein said inner joint member, said drive shaft, and said supporting face are structure as a unitary part.

5. An assembly according to claim 1 wherein said drive shaft and said inner joint member are formed with spline means therebetween nonrotatively joining them together.

* * * * *